June 6, 1961 F. KUHRT ET AL 2,987,581

SLOTTED HALL EFFECT TRANSDUCER

Filed May 11, 1960

United States Patent Office 2,987,581

Patented June 6, 1961

2,987,581

SLOTTED HALL EFFECT TRANSDUCER

Friedrich Kuhrt and Gustav Stark, Nurnberg, Germany, assignors to Siemens-Schuckertwerke Aktiengesellschaft, Berlin-Siemensstadt, Germany, a corporation of Germany Filed May 11, 1960, Ser. No. 28,259
Claims priority, application Germany May 13, 1959
5 Claims. (Cl. 179—100.2)

Our invention relates to transducer heads for translating magnetic signals into electric voltages, and in one of its particular though not exclusive aspects to a transducer head for reproducing magnetic signals from a signal carrier, such as magnetizable tape, by means of a Hall voltage generator.

Such Hall-voltage generators comprise a semi-conducting Hall plate mounted in a gap between pole shoes of high magnetic permeability so as to be subjected to a magnetic field when a magnetic signal is located near the gap. The gap may be formed by two plates of ferrite placed against each other and may be entirely or partially occupied by the Hall plate. The Hall plate may consist of a thin wafer or coating of semiconductor material deposited upon the gap face of one of the magnetizable plates.

For optimum sensitivity of such a transducer, it has been proposed to mount the Hall plate with its front edge substantially flush which the ends of the magnetizable plates to be contacted by, or located adjacent to, the magnetic signal carrier. However, while for obtaining maximum sensitivity the front edge of the Hall plate, on which one of its two Hall electrodes is located, should be perfectly flush with the adjacent surfaces of a magnetizable structure or should recede therefrom as little as possible, such a design makes it difficult to accommodate the necessary voltage-output conductor for this Hall electrode. It has been proposed therefore to provide the front side of the transducer head with an electrolytically produced groove through which the output conductor passes to the Hall electrode.

It is an object of our invention to provide a different, and for many uses, more advantageous, way of locating the front edge of the Hall plate in flush or substantially flush relation to the front face of the transducer head and to provide a voltage output lead for the frontal Hall electrode which does not involve the difficulty of spacial accommodation heretofore encountered particularly in the case of transducer heads required to occupy a minimum of space while also securing optimal sensitivity.

According to our invention, the generally rectangular Hall plate is slitted in the vicinity of the front edge up to near the middle of the plate. The narrow strip thus formed by the slit is then available, in entirety or partially, as a voltage output lead for the Hall electrode. The slitting is preferably effected from both adjacent sides of the Hall plate up to nearly the middle thus affording a double, symmetrical connection for the Hall voltage. In this manner, an induction-free Hall-electrode circuit can be obtained which is particularly desirable in sensitive measuring devices.

The foregoing and other features of our invention will be more fully explained in the following with reference to the embodiments of transducer heads according to the invention illustrated by way of example on the accompanying drawing, in which.

Figure 1:
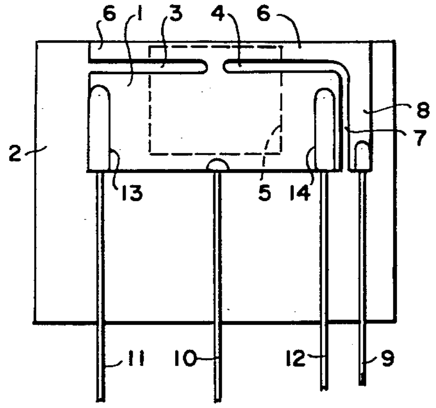
FIG. 1 illustrates on enlarged scale a portion of a transducer head provided with a Hall plate according to the invention.
Figure 2:
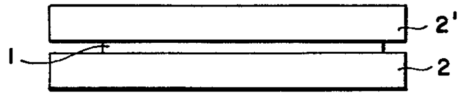
FIG. 2 is a top view, relative to FIG. 1, of generally the same but slightly modified transducer in assembled condition.
Figure 3:
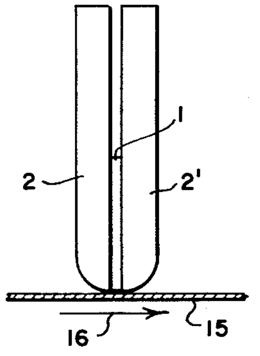
FIG. 3 is a lateral view of the transducer head according to FIG. 2, in conjunction with a magnetic recording tape.

The transducer head illustrated in FIGS. 1, 2 and 3 comprises a magnetizable structure composed of two ferrite plates 2 and 2'. Each plate may have a slightly raised pole-face portion 5. Located in the narrow gap between the pole faces is a generally rectangular Hall plate 1 consisting of a thin semiconductor layer for example of indium antimonide, indium arsenide or a similar semiconducting compound of the type $A_{III}B_{V}$ consisting of an element from the third group and an element from the fifth group of the periodic system. If desired, the raised portion 5 may be omitted so that the magnetizable plates have straight planar surfaces in face-to-face contact with the semiconducting Hall plate 1, as is shown in FIGS. 2 and 3.

When producing the transducer, the Hall plate can first be deposited as a coating upon one of the two ferrite plates, for example the plate 2, and can then be brought to the desired slight thickness by lapping or by electrolytic reduction. The resulting semiconductor layer may have a thickness of approximately 5 microns. The Hall plate thus produced in straight rectangular shape is thereafter provided with slits as shown at 3 and 4 in FIG. 1. These slits can be produced by chemical etching, mechanical machining or any other desired manner. The slits 3 and 4 are located near the front edge of the Hall plate 1 and are aligned with each other. They extend nearly but not completely to the middle of the plate so that a small bridge remains between the resulting frontal strip and the main body of the semiconductor. This bridge constitutes one of the two Hall electrodes of the semiconductor plate.

The frontal narrow strip 6 formed by slits serves entirely or in part as a voltage output conductor for the frontal Hall electrode. In the illustrated example, only one portion of the strip 6 is thus employed as conductor. For this purpose, the slit 4 is extended at 7 to form a right angle so that one of the strip portions 6 becomes joined with an extension strip 8 to which a connecting wire 9 is attached. The corresponding connecting wire for the rear Hall electrode of the plate 1 is denoted by 10. The remaining two edge portions of the plate main body are provided with current supply electrodes 13, 14 to which respective supply leads 11 and 12 are attached.

As the tape 15 (FIG. 3) or other magnetogram carrier travels along the front face of the transducer head, for example in the direction of the arrow 16, the recorded magnetic signals cause corresponding magnetic fields to appear in the gap between the magnetizable plates 2 and 2' with the result that corresponding electric voltages are produced between the two Hall electrodes of the Hall plate 1 when the plate is being traversed by current, for example direct current of constant voltage, flowing between the terminals 13 and 14.

It will be noted that according to FIG. 1 all four conductors of the Hall plate extend away from that plate in a direction normal to the rear edge. In this direction sufficient space for accommodating the conductors is available between the two magnetizable plates so that the above-mentioned difficulties, encountered with the previously disclosed Hall-voltage transducer devices, are eliminated. It will be noted that the conductor 8 connected with the frontal Hall electrode consists of semiconductor material, namely the same material of which the main body of the Hall plate is formed. By virtue of this feature, the invention affords the advantage that no thermal voltages can occur in the Hall-electrode circuits, and that the Hall-generator system receding from the frontal edge, cannot introduce zero-voltage variations in the electric output circuit as may otherwise be caused by varying temperature effects of the magnetogram carrier travelling relative to the Hall-voltage generating transducer head. Furthermore, no damage to the electric conductors by frictional wear can be caused even if there is a direct contact between the magnetogram carrier and the transducer head. The invention further affords the possibility of attaching all four contacts to the semiconductor plate in the same manner, such as by soldering or alloying.

Figure 4:
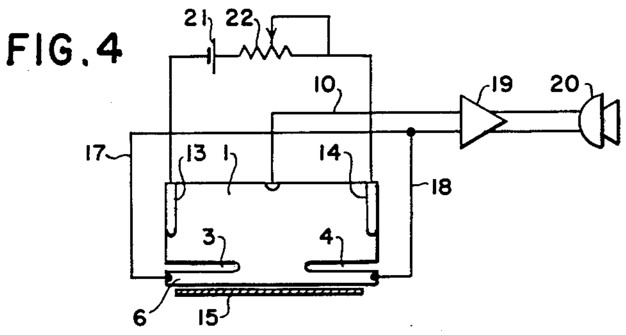
FIG. 4 is an example of a circuit diagram applicable with a transducer according to the invention and applied to a somewhat modified Hall plate.

The above-mentioned possibility of providing for a symmetrical circuit connection to minimize inductive errors is embodied in the device illustrated in FIG. 4, showing only the Hall plate of the transducer and a circuit diagram of the electric reproducing system. In this device, the Hall plate has only two mutually aligned slits 3 and 4 of straight shape, as explained above with reference to FIG. 1. Both portions of the resulting strip are connected with conductors 17 and 18 respectively, which are both connected to one pole of an amplifier 19, whose other input terminal is connected to the rear Hall electrode by the conductor 10. The amplifier 19 is shown to operate a loud speaker 20, for example. The terminals 13 and 14 of the Hall plate 1 are connected to a direct current source 21 in series with a current adjusting resistor 22. It will be understood that the current source 21 may be a carrier-frequency source if it is desired to use an alternating-current amplifier.

Figure 5:
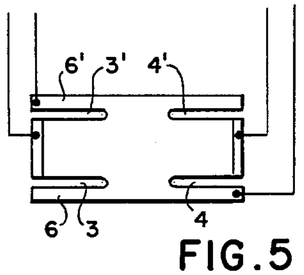
FIG. 5 illustrates still another modification of a Hall plate applicable in such transducers.

The Hall plate of the transducer illustrated in FIG. 5 is provided with two mutually aligned slits 3 and 4 along the forward and rear edges respectively of the Hall plate so that two symmetrical strips 6 are formed. In this case both Hall electrodes are constituted by the respective bridges which join the strips with the main body of the semiconductor plate. While in FIG. 5 only one electric conductor is shown attached to each of the two Hall electrodes via the respective strips 6 and 6', it is apparent that two connecting conductors may be used at the respective opposite ends of each strip 6 in order to obtain a symmetrical connection of minimized induction.

We claim:

1. A transducer head for reproducing signals from a magnetic-signal carrier, comprising magnetizable structure having a gap to be located adjacent to the carrier when in operation, a semiconductor Hall plate located in said gap and having a generally rectangular overall shape with one edge located near the carrier-adjacent gap end, said plate having two current supply terminals on the respective two edges perpendicular to said one edge and having a first Hall electrode located on the fourth edge midway between said two terminals, and said plate having a slit extending near said one edge and parallel thereto up to a point near the middle of said plate so as to separate a strip from the main body of said plate, whereby the junction of said strip with said body forms a second Hall electrode and said strip forms a voltage output conductor for said second electrode.

2. A transducer head for reproducing signals from a magnetic-signal carrier, comprising magnetizable structure having a gap to be located adjacent to the carrier when in operation, a semiconductor Hall plate located in said gap and having a generally rectangular overall shape with one edge located near the carrier-adjacent gap end, said plate having two current supply terminals on the respective two edges perpendicular to said one edge and having a first Hall electrode located on the fourth edge midway between said two terminals, and said plate having two mutually aligned and straight slits extending from said respective two terminal edges to near the middle of the plate in parallel relation to and near said one edge, said slits forming a strip separated from the main body of the plate and joined therewith in the middle of the plate, whereby the junction forms a second Hall electrode and said strip forms a voltage output conductor for said second electrode.

3. In a transducer head according to claim 1, said slit having an extension parallel and near to one of said two terminal edges so that said slit and said strip have rectangular shape, and four wires attached to the end of said strip and to said first electrode and said two terminals respectively, all of said four wires extending away from said plate in a direction substantially normal to said fourth edge and substantially in the plane of said plate.

4. A transducer according to claim 2, comprising two Hall voltage leads symmetrically connected to said strip at the two respective ends thereof.

5. In a transducer according to claim 2, said plate having a second pair of slits extending in symmetry to the first two slits along and near said fourth edge, so as to form a second strip, whereby said second Hall electrode is formed by the junction of said second strip with said main body of said plate, and said second strip forms a voltage output conductor for said second Hall electrode.

No references cited.